United States Patent [19]
Bainbridge et al.

[11] 3,836,166
[45] Sept. 17, 1974

[54] PNEUMATIC SUSPENSION SYSTEMS FOR VEHICLES

[75] Inventors: Wilfred Nicholas Bainbridge; Robert Hazell Pitcher, both of Leamington Spa, England

[73] Assignee: Automotive Products Limited, Leamington, Spa, Warwickshire, England

[22] Filed: Nov. 13, 1972

[21] Appl. No.: 306,053

[52] U.S. Cl............................ 280/124 F, 267/64 R
[51] Int. Cl............................................. B60g 17/00
[58] Field of Search ................ 267/64 R; 280/124 F

[56] References Cited
UNITED STATES PATENTS
3,323,810   6/1967   Klein............................ 267/64 R X Primary Examiner—Philip Goodman

[57] ABSTRACT

A pneumatic vehicle suspension system in which the part of the weight of the vehicle supported by each wheel is transmitted thereto through compressed gas contained in a variable volume chamber, the variable volume chamber associated with each wheel being included in a gas-containing system the volume of which is arranged to be varied by control means responsive to dynamic forces acting in at least one horizontal direction to vary the weight distribution between the vehicle wheels, so as to resist tilting of the vehicle due to the changed weight distribution, the response of said control means being limited by feed-back mechanism.

3 Claims, 1 Drawing Figure

PATENTED SEP 17 1974  3,836,166
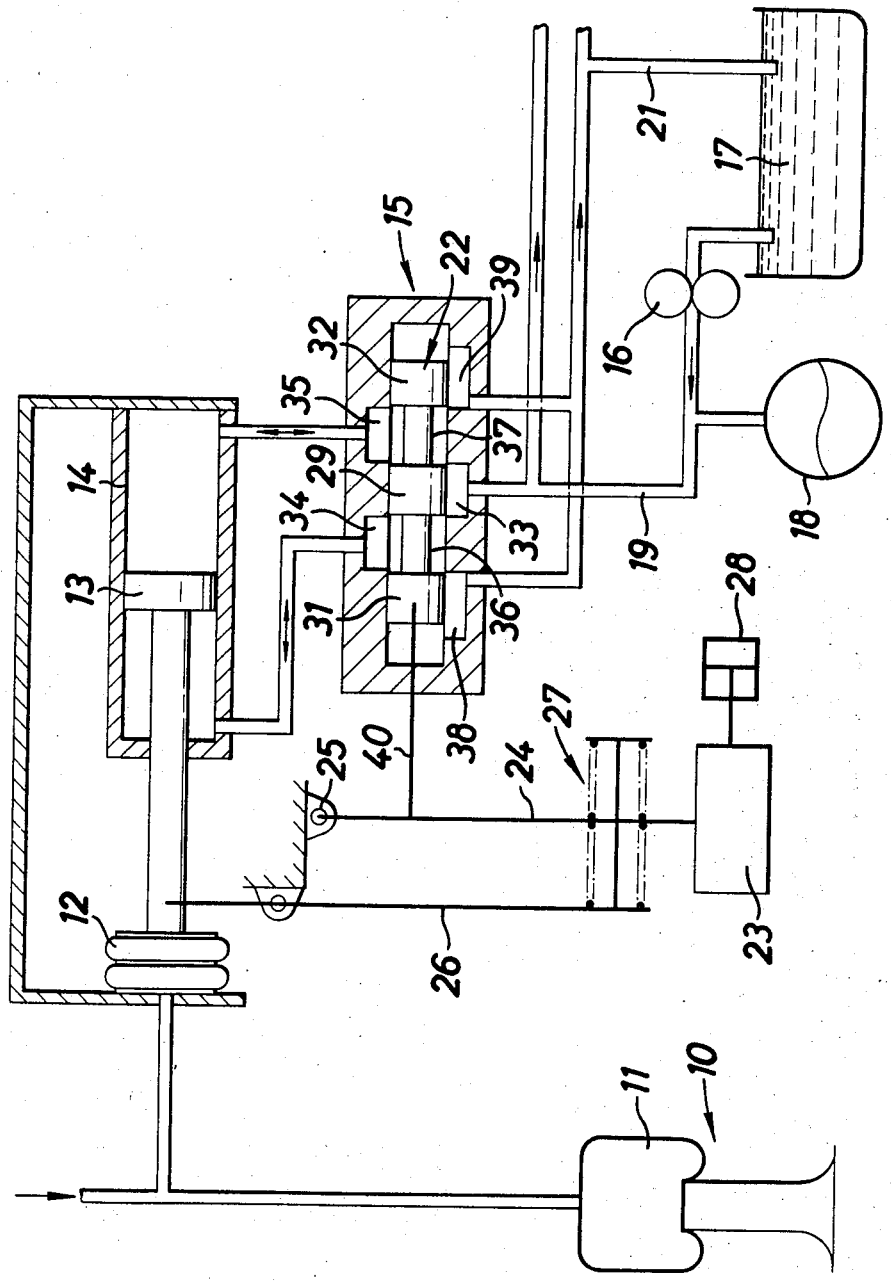

PNEUMATIC SUSPENSION SYSTEMS FOR VEHICLES

This invention relates to pneumatic suspension systems for vehicles and has for its object to provide, for use in such a pneumatic suspension system, means for automatically preventing either rolling of a vehicle during cornering or travel in a horizontally curved path, pitching of the vehicle due to acceleration or deceleration, or both rolling and pitching.

According to the present invention there is provided a pneumatic vehicle suspension system including, in association with each wheel of the vehicle, a variable volume chamber containing compressed gas through which the weight of the vehicle supported by that wheel is transmitted thereto, the volume of said chamber tending to be decreased by an increase in said supported weight and increased by a decrease in said supported weight, wherein the variable volume chamber associated with each of the said wheels is included in a gas-containing system the volume of which is also variable by control means responsive to dynamic forces acting laterally, longitudinally, or both laterally and longitudinally of the vehicle to vary the weight distribution between the said wheels, the said volume variation acting to increase the pressure in the gas containing systems associated with wheels on which the weight is increased and to reduce the pressure in the gas containing systems associated with wheels on which the weight is reduced, feed-back mechanism being provided to limit the said increase or decrease of pressure in accordance with the changes of weight distribution.

Preferably, each gas-containing system includes, in addition to the variable volume chamber containing gas transmitting the vehicle weight to the wheel, a second variable volume chamber the volume of which is varied by the said control means.

The control means may comprise a fluid pressure ram-and-cylinder device connected to a source of fluid pressure through a control valve which is itself controlled by a pendulum.

The fluid pressure ram-and-cylinder device is preferably operated by liquid pressure.

The feed-back mechanism may comprise a spring assembly acting on the pendulum to oppose the dynamic forces acting thereon, and linkage connecting said spring assembly to said ram-and-cylinder device in such a way that movement of the ram-and-cylinder device increases the force exerted by said spring assembly to oppose the movement of the pendulum causing movement of the control valve to effect such movement of the ram-and-cylinder device.

There will now be described, with reference to the accompanying drawing, one embodiment of a pneumatic suspension system for a vehicle according to the invention. The drawing, which is diagrammatic, shows the parts of the system associated with one wheel of a vehicle together with a fluid pressure supply system providing pressure to control the action of the suspension system at all of the wheels. It is assumed, for the purposes of the description, that the suspension system is mounted on a four-wheeled vehicle.

Referring to the drawing there is provided, between each wheel of the vehicle and the body, a suspension unit 10 including a variable volume chamber 11 filled with compressed air and so arranged that an increase in the load supported by the wheel tends to reduce the volume of the said chamber 11 and so increase the gas pressure therein to support the increased load. Such suspension units are known and will not be described in detail herein.

Each of the said variable volume chambers 11 is incorporated in a gas-containing system including, in addition to that variable volume chamber, a second variable volume chamber 12 conveniently in the form of a bellows, and the said second variable volume chamber 12 is acted on by the ram 13 of a double-acting liquid pressure ram-and-cylinder device both ends of the cylinder 14 of which are connected to a control valve 15 arranged normally to trap liquid in both ends of the said cylinder 14 but operable to connect either end of the cylinder to a source of liquid under pressure and to connect the other end thereof to a low pressure reservoir.

The source of liquid pressure is a pump 16 drawing liquid from a low-pressure reservoir 17 and supplying liquid under pressure to an accumulator 18. Conduits 19 and 21 connecting the control valve 15 respectively to the pump 16 and accumulator 18 and to the reservoir 17, are branched as shown to connect the said pump and accumulator, and the reservoir, to other similar control valves associated with suspension units for other wheels of the vehicle.

The control valve 15 is a spool valve the spool 22 of which is coupled to a pendulum comprising a mass 23 suspended on a rod 24 from a fixed pivot at 25, the said pendulum hanging vertically when the vehicle is in a level attitude and is not subjected to lateral acceleration in the plane of swing of the pendulum. Displacement of the pendulum 23, 24 from its vertical position moves the valve spool 22 from its normal position to connect one end of the cylinder 14 of the ram-and-cylinder device to the pressure source and the other end to the reservoir, thus moving the ram 13 to increase or decrease the volume of the second variable volume chamber 12 and so decrease or increase the gas pressure in the gas-containing system.

A feed-back mechanism is provided to control the degree of decrease or increase of gas pressure, the said feed-back mechanism comprising a lever 26 coupled to the ram 13 of the ram-and-cylinder device and acting on a spring assembly 27 which in turn acts on the pendulum 23, 24, to apply a spring load thereto opposing the dynamic force tending to displace the pendulum.

As shown diagrammatically in the drawing, the spring assembly 27 comprises two springs acting on opposite sides of the pendulum rod 24, each of the said springs reacting on an abutment formed on or carried by the lever 26. A fluid damper 28, or other damping device is provided to damp the movements of the pendulum 23, 24.

If it is desired to control only rolling of the vehicle, the pendulum 23, 24 is mounted to swing in a vertical plane transverse to the vehicle. If it is desired to control only pitching of the vehicle, the pendulum 23, 24 is mounted to swing in a vertical longitudinal plane of the vehicle. Control of both roll and pitch may be provided by mounting the pendulum to swing in a vertical plane inclined to both the longitudinal and transverse planes.

The control valve spool 22 is provided with three lands 29, 31, 32 the centre one, 29, of which normally substantially covers a slot 33 in the valve body bore connected through the conduit 19 to the pump 16 and accumulator 18, similar slots 34 and 35 connected each to one end of the cylinder 14 of the ram-and-cylinder device being respectively in constant communication with grooves 36, 37 in the spool 22 separating the centre land 29 from the other two lands 31, 32 The said other two lands normally substantially cover slots 38 and 39 in the valve body bore which are both connected by the conduit 21 to the liquid reservoir. Thus, with the valve spool 22 in a normal, central position, a restricted flow of liquid under pressure can take place through the control valve on both sides of the central land 29, maintaining equal pressures in opposite ends of the cylinder 14, but any slight displacement of the said spool, one side of the ram 13 is cut off from the reservoir 17 and freely connected to the pressure source, so a pressure differential is created to move the ram.

The valve spool 22 is connected by a rigid link 40 to the pendulum rod 24.

Separate ram-and-cylinder devices 13, 14 control valves 15 and pendulums 23, 24 are provided one for each of the gas-containing systems, and the arrangement is such that movement of the pendulum of any one such system due to dynamic forces tending to increase the load on the wheel of the vehicle with which that system is associated operates the valve of that system to reduce the volume of the second variable volume chamber 12 and thereby increase the pressure in, that system, whilst movement of the said pendulum due to dynamic forces tending to reduce the load on the said wheel operates the said valve to increase the volume of the second variable volume chamber 12 of, and thereby reduce the pressure in, that system. Consequently, the changes in pressure in the gas-containing systems oppose rolling or pitching of the vehicle which would normally be caused by such dynamic forces, the feed-back mechanism limiting the opposing force to that which is necessary to maintain a substantially level attitude of the vehicle.

It will be understood that the apparatus for varying the volume of the gas-containing systems in response to the dynamic forces may be different from the apparatus specifically described herein, the volume varying means being, for example, screw jacks or like devices driven by electric motors the supply of current to which is controlled by the pendulums.

Each of the gas-containing systems may consist of only a single chamber corresponding to the chamber 11, means such as a diaphragm or piston capable of moving to vary the volume of that chamber being operated by the ram-and-cylinder device.

If the suspension is required to provide only resistance to rolling, only two gas-containing systems may be provided each including variable volume chambers associated with all the wheels on one side of the vehicle. If resistance only to pitching is required two gas-containing systems may respectively include variable volume chambers associated with the front and rear wheels of the vehicle. Other arrangements may be provided on vehicles having more than four wheels.

We claim:

1. A pneumatic vehicle suspension system for use with each wheel of a vehicle, comprising a first variable volume chamber containing compressed gas through which the weight of the vehicle supported by each wheel is transmitted thereto, with the volume of said chamber tending to be decreased by an increase in the supported weight and increased by a decrease in the supported weight, a second variable volume chamber in communication with said first variable volume chamber, a gas-containing system operatively connected with said second variable volume chamber, control means for varying the volume of said second variable volume chamber, including fluid pressure ram cylinder means, a control valve operatively connected to said ram means for actuation thereof and a source of fluid pressure for said control valve to actuate it, and vehicle attitude sensitive means operatively connected to said ram cylinder means for actuation thereby, and responsive to the variation in the wheel weight to restore the volume in said first volume chamber to its normal condition.

2. A pneumatic vehicle suspension system according to claim 1, wherein the fluid pressure ram-and-cylinder device is operated by liquid pressure.

3. A pneumatic vehicle suspension system according to claim 2, wherein said sensitive means comprises a spring assembly acting on a pendulum to oppose the dynamic forces acting thereon, and linkage connecting said spring assembly to said ram-and-cylinder device in such a way that movement of the ram-and-cylinder device increases the force exerted by said spring assembly to oppose the movement of the control valve to effect such movement of the ram-and-cylinder means.

* * * * *